United States Patent [19]

Mielke

[11] Patent Number: 4,562,327
[45] Date of Patent: Dec. 31, 1985

[54] PISTON AND PROCESS OF PROVIDING WEAR-RESISTING SURFACES IN THE RING GROOVES OF AN ALUMINUM ALLOY COMBUSTION ENGINE PISTON

[75] Inventor: Siegfried Mielke, Neckarsulm, Fed. Rep. of Germany

[73] Assignee: Karl Schmidt GmbH, Neckarsulm, Fed. Rep. of Germany

[21] Appl. No.: 560,779

[22] Filed: Dec. 12, 1983

[30] Foreign Application Priority Data

Dec. 16, 1982 [DE] Fed. Rep. of Germany ....... 3246630
Nov. 4, 1983 [DE] Fed. Rep. of Germany ....... 3339867

[51] Int. Cl.⁴ ............................................... B23K 9/04
[52] U.S. Cl. ............................ 219/76.11; 29/156.5 R; 92/231; 219/76.14
[58] Field of Search ................. 219/137 R, 61.7, 76.1, 219/76.11, 76.14; 277/189.5; 29/156.5 R, 156.63; 92/222, 231, 260; 228/165, 170, 174

[56] References Cited

U.S. PATENT DOCUMENTS 3,014,771 12/1961 Nichols ............................ 277/189.5
3,285,717 11/1966 Fischer ................................ 428/650
4,223,197 9/1980 Imai et al. ......................... 219/61.7
4,233,490 11/1980 Shalai et al. .................... 219/137 R Primary Examiner—C. L. Albritton
Assistant Examiner—Alfred S. Keve
Attorney, Agent, or Firm—Sprung Horn Kramer & Woods

[57] ABSTRACT

An arc welding process is used for form wear-resistant surfaces at least in the uppermost ring groove of aluminum alloy pistons for internal combustion engines. To reduce the manufacturing costs and to avoid an increase of the weight of the piston, the piston blank is formed by machining with a groove in at least one region to be provided with a ring groove having wear-resistant surfaces. During a rotation of the piston blank about its longitudinal axis said groove is entirely filled by arc welding with a filler material which comprises a silicon-containing aluminum alloy. The molten pool is solidified as quickly as possible by an adequate cooling. The ring groove is subsequently formed by machining.

14 Claims, 3 Drawing Figures

PISTON AND PROCESS OF PROVIDING WEAR-RESISTING SURFACES IN THE RING GROOVES OF AN ALUMINUM ALLOY COMBUSTION ENGINE PISTON

BACKGROUND OF THE INVENTION

This invention relates to a piston and a process of providing wear-resistant surfaces in the ring grooves or at least in the uppermost ring groove, preferably on the side faces of the ring grooves, in internal combustion engine pistons consisting of aluminum alloys for pistons, by arc welding, such as metal electrode inert gas welding and plasma arc welding.

In certain known internal combustion engines the ring grooves are or are likely to be subjected to particularly heavy wear, especially in the uppermost ring groove, and this heavy wear, which is due to the design of the engine or the location where it is used, may result in breakage of the piston rings.

Such heavy wear is likely to occur if the overall design of the internal combustion engine involves abnormally high temperatures in the ring zone or when fuel leaving an extremely large amount of residues is used, or when a large piston clearance has been selected for special reasons so that tilting motions of the piston are permitted, or when the air cannot be adequately cleaned, particularly in a highly dust-laden environment, e.g., on building sites.

So-called ring carrier pistons are used in such cases and comprise a piston body, which consists of an aluminum alloy for pistons and in which a ring carrier consisting of ferrous material and formed with the machined piston ring groove is mounted on the piston body at least adjacent to the uppermost piston ring and is embedded in a bonding layer consisting of an intermetallic compound (Fachkunde Kraftfahrttechnik, 2nd edition, Holland+Josenhans-Verlag, Stuttgart 1982, page 27). The embedded ring carrier involves an undesirable increase of the weight of the aluminum piston.

In a piston made of an aluminum alloy it is also known to machine a groove in the region to be provided with the piston rings and to provide the surfaces of said groove by metal spraying with a thin interlayer consisting of molybdenum, titanium, cobalt, nickel or an alloy thereof or of stainless steel and thereafter to fill said groove with a stainless steel having a high chromium content and a specified nickel content, whereafter the ring grooves are formed (Laid-open German Application No. 14 00 115). That practice has the disadvantage that there is only a poor bond between the aluminum alloy and the sprayed interlayer.

In order to improve the wear resistance of the surfaces of an aluminum alloy piston, U.S. Pat. No. 3,285,717 proposes to form a coating consisting of a wear-resistant aluminum alloy composed of 12 to 30% silicon, 10 to 30% copper, 2 to 6% manganese and optionally up to 6% iron, 0.5 to 5% nickel, 0.5 to 3% chromium and 0.5 to 1% of various other metals, such as titanium, vanadium, tungsten, molybdenum etc., balance aluminum, in a plasma arc welding process in which the aluminum alloy filler is liquefied in an electric arc and impinges on the fused surface of the piston material so as to form a hard surface layer thereon. The composition of the surface layer changes from the outside to the inside in such a manner that the layer which contains the least filler material is underneath. The alloy is formed by the diffusion of the aluminum alloy of the filler into the surface of the aluminum piston.

German Patent Publication No. 22 00 033 describes a process by which the wear resistance particularly in the uppermost ring groove of aluminum alloy pistons for internal combustion engines is improved in that an aluminum alloy containing 18 to 30% silicon and 2 to 6% copper is fusion-joined to the aluminum alloy of the piston by electron beams so that the concentration of alloying elements is increased. Such processes have not been successful because the expenditure involved in making the wear-resisting layer is excessive, as a rule.

SUMMARY OF THE INVENTION

For this reason it is an object of the present invention to develop a process by which the surface of the piston ring grooves, at least of the uppermost ring groove, of a piston consisting of aluminum alloy for pistons, can be made wear-resistant particularly on the side faces of the ring groove in such a manner that a compromise is achieved between the relatively high wear resistance of the ring groove of a piston provided with a ring carrier and the relatively low wear resistance of the ring groove of a piston having a wear-resistant layer formed in that the aluminum alloy of the piston has been alloyed up by means of an aluminum alloy filler, whereas the weight of the piston and its manufacturing costs are not increased.

This object is accomplished in that in at least one region to be provided with a ring groove having wear-resistant surfaces, the piston blank is formed by machining with a groove, during a rotation of the piston blank about its longitudinal axis said groove is entirely filled by arc welding with a filler material which comprises a silicon-containing aluminum alloy, the molten pool is solidified as quickly as possible by an adequate cooling, and the ring groove is subsequently formed by machining.

DETAILED DESCRIPTION OF THE INVENTION

Figure 1:
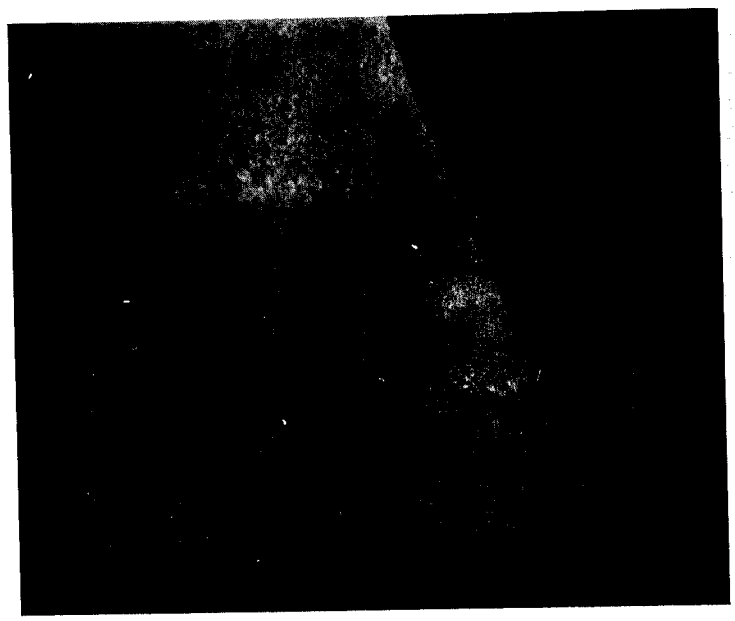
FIG. 1 is a photograph showing an 8x magnification of a polished portion of a piston produced according to the invention.

In accordance with a special feature of the invention the welding operation is carried out at a rate of travel amounting to 0.25 to 1.5 meters per second, preferably 0.5 to 1 meter per second, so that a cooling rate of $10^2$ to $10^5$ K/s is achieved at the solidification front of the hard alloy; this is of decisive influence for the formation of an optimum structure of the hard alloy.

In special cases the rapid cooling can be effectively promoted by the use of water or air jets or by a suitable cooling with a liquid from inside of the piston.

In a preferred embodiment of the process according to the invention the groove machined into the piston blank is filled with a hard alloy in that the surface of the piston material is fused and an electrode consisting of the silicon-containing aluminum alloy and at least one additional electrode consisting of another filler material for increasing the hardness and wear resistance are fused down at the same time by an arc welding operation performed at a relatively high rate of travel.

The term hard alloy is used to describe complexes consisting of polyphase alloys having a structure consisting of a relatively plastic matrix and hard materials embedded in said matrix. Hard alloys include also so-called pseudo-alloys, such as metal blends or phase blends.

To produce the hard alloy, other filler materials consisting of iron, nickel, chromium copper, tungsten, manganese, molybdenum, titanium, zirconium, vanadium, niobium, boron or their alloys or pseudo-alloys or blends of said elements are used in combination with the silicon-containing aluminum alloy.

The alternate dripping from the electrodes which respectively consist of the silicon aluminum alloy and the other filler material or materials results in a thorough mixing of the filler materials or the hard alloy formed from the filler materials with the incipiently fused piston material.

The silicon-containing aluminum alloy may particularly consist of an overeutectic aluminum alloy composed of 11 to 30% silicon, 0.8 to 1.8% copper, 0.8 to 1.6% nickel, 0.4 to 1.3% magnesium, balance aluminum. The alloy may also contain 0.5 to 20% iron, if desired, and/or up to 15% copper and/or up to 15% nickel.

The groove machined into the piston blank is larger in cross-section than the ring groove in the finish-machined piston. In most cases it will be sufficient to form the groove in the piston blank by machining to such a depth that the side faces of the ring groove in the finish-machined piston will have a wear-resistance surface only in that portion which will be subjected to wear by the piston ring. The bottom of the ring groove and the adjoining portions of the side faces of the ring groove are hardly subjected or not subjected to wear by the piston ring.

The additional filler material which is used together with the silicon-containing alloy in the arc welding process using a consumable electrode has desirably such a composition that the total content of the filler elements other than aluminum and silicon in the hard alloy is between 15 and 50% by volume.

30 to 50% of the hard alloy may have the same composition as the piston material. 30 to 80% of the area of those surfaces of the finally machined ring groove which consist of the hard alloy are preferably formed by hard phases.

By means of the process according to the invention, a firmly adhering, wear-resistant surface layer having a hardness in excess of Bhn 150, preferably of Bhn 180 to 250, can be produced by the formation of finely distributed intermetallic phases with a relatively low expenditure.

The production will now be explained by an example.

In the region to be formed with the uppermost ring groove, a piston blank consisting of an aluminum alloy of the type AlSi12CuNiMg is machined to form a groove having a width of 4 mm, a depth of 2 mm and a corner radius R2. While the piston is rotated about its longitudinal axis, that groove is filled with a hard alloy by a pulse-controlled metal electrode inert gas are welding process which was carried out at a rate of travel of 1 meter per second and in which an electrode consisting of AlSi12 (1.6 mm in diameter) and an electrode consisting of NiCu30Fe (0 6 mm in diameter) are fused down at the same time. The hard alloy was formed from the two filler material in the groove. In the hard alloy the hard phases consist preferably of nickel and nickel aluminides and the matrix consists of AlSi12. The hard alloy has a hardness of Bhn 210 and has the following composition:

| Si | 9.77% | Mn | 0.19% |
| Cu | 6.65% | Zn | 0.03% |
| Mg | 0.39% | Pb | 0.02% |
| Ni | 12.86% | Ti | 0.03% |
| Fe | 0.56% | Al | balance |

Figure 2:
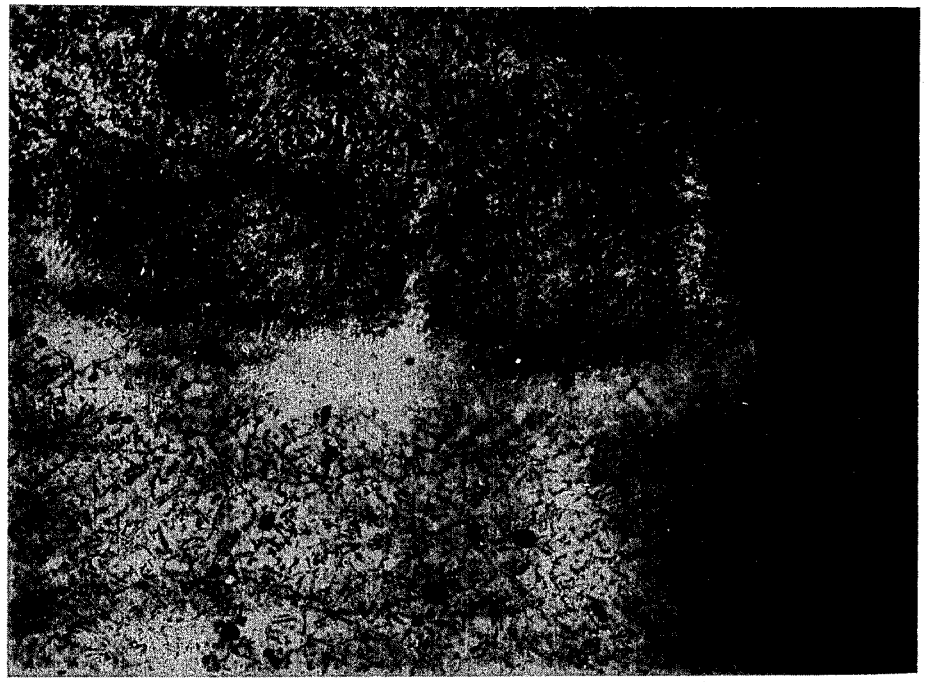
FIGS. 2 and 3 are photographs showing 100x and 500x magnifications of the structure in the transmittal region between the piston material and the hand alloy.
Figure 3:
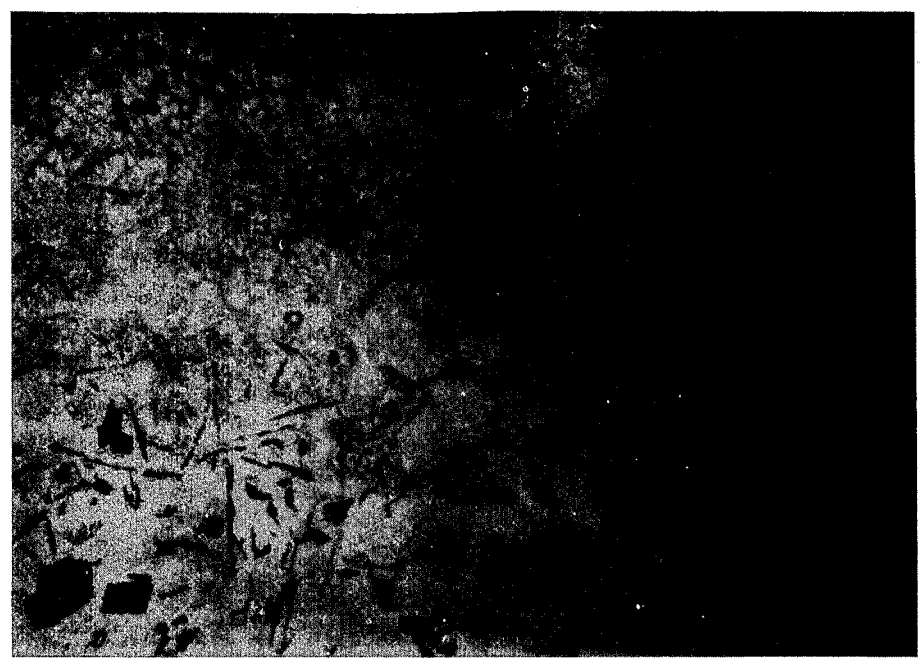

FIG. 1 shows in eightfold magnification a polished portion of a longitudinal section of the upper region of the piston which is formed with the initial groove that has been filled with the hard alloy. FIGS. 2 and 3 show in 100-fold and 500-fold magnifications, respectively, the structure in the transitional region between the piston material and the hard alloy. The porosity of the structure is negligible and it has no oxidic inclusions.

To provide the side faces of the uppermost ring groove with wear-resistant surfaces, the groove which has been formed in the piston blank and in which the distance between the upper and lower surfaces of the groove is larger than the distance between the side faces of the ring groove in the finish-machined piston may be completely filled by arc welding only with an aluminum alloy composed of 12% silicon, 15% copper, 15% nickel, 1% magnesium, balance aluminum, and said filler material in said groove may then be machined to form the ring groove.

What is claimed is:

1. In a process of providing wear-resistant surfaces in at least the uppermost ring groove in an aluminum alloy internal combustion engine piston by arc welding, the improvement comprising: forming a groove in a piston blank in at least one region to be provided with a ring groove by machining, rotating the piston blank about its longitudinal axis and during rotation, entirely filling the groove by arc welding with a filler material which comprises a silicon-containing aluminum alloy, wherein the step of filling the groove machined into the piston blank comprises filling same with a hard alloy by fusing the surface of the piston material and fusing down an electrode consisting of the silicon-containing aluminum alloy and at least one additional electrode consisting of another filler material for increasing the hardness and wear resistance at the same time by arc welding performed at a high rate of travel, solidifying the molten pool as quickly as possible by cooling, and thereafter forming the ring groove by machining.

2. The process according to claim 1, wherein the step of welding is carried out at a rate of travel amounting to 0.25 to 2.5 meters per second.

3. The process according to claim 2, wherein the rate is 0.5 to 1 meter per second.

4. The process according to claim 1, wherein the step of solidifying the molten pool formed by arc welding is carried out by water jets, air jets or by liquid cooling from the inside of the piston.

5. The process according to claim 1, wherein iron, nickel, chromium copper, tungsten, manganese, molybdenum, titanium, zirconium, vanadium, niobium, boron or their alloys or pseudo-alloys or blends are used as filler material.

6. The process according to claim 1, comprising using an overeutectic silicon aluminum alloy which is composed of 11 to 30% silicon, 0.8 to 1.8% copper, 0.8 to 1.6% nickel, 0.4 to 1.3% magnesium, balance aluminum and, optionally contains at least one of 0.5 to 2.5% iron, up to 15% copper and up to 15% nickel.

7. The process according to claim 1, wherein the piston blank is machined to form a groove which is larger in cross-section than the ring groove in the finish-machined piston.

8. The process according to claim 1, wherein the groove in the piston blank is formed by machining to such a depth that the side faces of the ring groove in the finish machined piston will have a wear-resistance surface only in that portion which will be subjected to wear by the piston ring.

9. The process according to claim 1, wherein 30 to 80% of the area of those surfaces of the finally machined ring groove which consist of the hard alloy are formed by hard phases.

10. An aluminum alloy piston for use in internal combustion engines, wherein at least the uppermost ring groove has at least on its side faces wear-resistant surfaces formed by a facing material which is fusion-bonded to the piston material and comprises a silicon-containing aluminum alloy formed by fusing down an electrode consisting of the silicon-containing aluminum alloy and at least one additional electrode consisting of another filler material for increasing the hardness and wear resistance at the same time by arc welding performed at a high rate of travel, wherein said filler material consists of a hard alloy which includes a matrix and hard phases embedded in said matrix.

11. The aluminum alloy piston according to claim 10, wherein said hard alloy contains iron, nickel, chromium, copper, tungsten, manganese, molybdenum, titanium, zirconium, vanadium, niobium, boron or alloys, pseudoalloys or blends thereof.

12. The aluminum alloy piston according to claim 10, wherein 30 to 80% of the area of those surfaces of the ring groove which consist of the hard alloy are formed by said hard phases.

13. The aluminum alloy piston according to claim 10, wherein the total contents of elements other than aluminum and silicon in said hard alloy is between 15 and 50% by volume.

14. The aluminum alloy piston according to claim 10, characterized in that said matrix consists of AlSi12 and said hard phases comprise nickel and nickel aluminides.

* * * * *